Dec. 15, 1953     L. L. EAKIN     2,662,654
VEHICLE LOADING AND UNLOADING APPARATUS
Filed Feb. 12, 1951     2 Sheets-Sheet 1

*Fig.1*

INVENTOR.
LOURIE L. EAKIN.
BY
Walter J. Stevenson
Agent.

Dec. 15, 1953   L. L. EAKIN   2,662,654
VEHICLE LOADING AND UNLOADING APPARATUS
Filed Feb. 12, 1951   2 Sheets-Sheet 2

INVENTOR.
LOURIE L. EAKIN.
BY
Walter J. Stevenson
Agent.

Patented Dec. 15, 1953

2,662,654

UNITED STATES PATENT OFFICE 2,662,654

VEHICLE LOADING AND UNLOADING APPARATUS

Lourie L. Eakin, Ventura, Calif.

Application February 12, 1951, Serial No. 210,480

3 Claims. (Cl. 214—504)

This invention relates to a material handling apparatus, and more particularly to a motor truck capable of transporting both heavy, solid objects and loose material to a site, and embodying means for unloading the objects and material from the truck. The present application is a continuation-in-part of my pending application for patent on Hoisting Apparatus, Serial No. 73,694, filed January 31, 1949, now Patent No. 2,582,111.

During the construction and maintenance of oil wells and their operating equipment, it is necessary to deliver to the wells various oil well components, such as motors, pumps, tubing, drills, and other heavy equipment, and it frequently occurs that loose material, such as sand, cement, stones, etc., may be required. It has heretofore been customary to deliver the heavy, solid objects to the site on a motor truck having a platform for supporting the objects and a hoisting boom adapted to place the objects on and unload them from the platform. The loose material is usually transported in a separate dump-truck having a tiltable receptacle or holder for containing the loose material, the receptacle providing a chute, when tilted from its normally horizontal position, for discharging its contents from the rear end of the truck. It is thus seen that two different forms of trucks have heretofore been deemed necessary to deliver the various forms of equipment and material.

Since it frequently occurs that a small amount of loose material may be required at a location where a pump, motor, or other piece of equipment, is to be delivered, the use of a separate dump-truck for the purpose is obviously unwarranted, although heretofore tolerated due to the lack of a single truck capable of delivering both heavy, solid objects and loose material. The failure of prior inventors to supply a single truck designed for this dual purpose has apparently been due to the fact that conventional hoisting apparatus usually occupies at least a portion of the area of the truck platform where the tiltable dump receptacle would normally be located.

It is therefore an object of the present invention to provide a support, such as the platform of a motor truck, and a hoisting boom having arms pivoted to the sides of the platform so as to leave the full area of the platform available for transporting objects and material. The truck also has a dump receptacle pivoted at its rearward end and normally resting upon the platform in position to receive and transport loose material, the receptacle being tiltable to effect unloading of the material from the rearward end of the receptacle.

An important object is to provide a truck, of the character referred to, in which the same motive power used for operating the boom is employed for tilting the dump receptacle, thereby simplifying the over-all construction of the truck by reducing the number of parts to a minimum and greatly facilitating the operation of the unloading means. Since reduction in the number of operating parts results in a less complex structure, it follows that the cost of manufacturing and servicing the combination truck is substantially less than that of separate trucks heretofore employed.

A further object of the invention is to provide a combination truck having a simple means by which the dump receptacle can be connected for operation by the hoisting boom, this means comprising rollers rotatable at the sides of the receptacle and adapted to be engaged by the opposite arms of the boom as the latter is swung upwardly and rearwardly from its forward, inoperative position. A related object is to provide retractible mounting means for the rollers, this means consisting of a pair of trunnions, each mounting means being pivotally connected to a side of the receptacle and movable from a retracted position in which the roller carried thereby is disposed adjacent the side of the receptacle to an extended, operative position in which the roller is disposed within the plane of movement of an arm of the boom with its axis of rotation extending normal to said plane. By this means tilting of the dump receptacle to unloading position may be readily effected by simply shifting the roller means to a position to be engaged and raised by the arms of the boom when the latter is moved toward its rearward extended position. In addition, the receptacle may be retained in its load-transporting position by merely shifting the roller means to inoperative position so that independent operation of the boom to load and unload heavy objects onto and from the truck platform may be effected.

A still further object is to provide locking means by which the rollers may be locked in their operative or extended position, this means comprising locking pins which are insertable through aligned holes in bearing ears on the sides of the dump receptacle and apertures in the roller supporting trunnions.

With these and other objects in view, as will appear hereinafter, I have devised a hoisting apparatus having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a side elevational view of an automobile platform truck embodying a hoisting boom for placing objects upon and removing them from the platform of the truck, and a tiltable dump receptacle for containing various forms of loose material, the receptacle being adapted to tilt to the unloading position indicated by broken lines;

Figure 2:
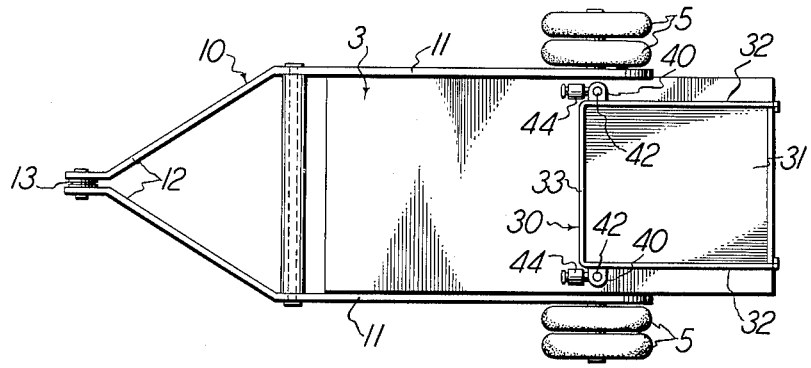
Fig. 2 is a plan view of the rearward end of the truck, showing the boom and dump receptacle in their inoperative positions.

Referring to the drawings in detail, I have shown my invention as applied to use in connection with a conventional motor truck having a driver's cab 2 at the forward end and a platform 3 at the rearward end, the platform being carried on the frame or chassis 4 which, in turn, is supported by the wheels 5.

The truck also includes a hoisting means which includes a boom 10 having opposite arms 11 which are parallel throughout the greater portion of their length and which converge at one end, as indicated at 12 in Fig. 2, a sheave 13 being rotatable at this end. The opposite end of the boom is pivoted on an axle 14 extending transversely of the platform adjacent the rearward end thereof. The boom 10 is adapted to pivot to a forward, retracted position in which its arms 11 extend alongside the side rails 6 of the platform and in which its free end overlies the cab 2, as shown in full lines in Fig. 1. The boom 10 is also adapted to pivot to the rearward, extended position indicated by the dot-and-dash lines in Fig. 1 and to positions intermediate the retracted and extended positions, as designated by the dotted lines in this view.

A cable 16 extends around the sheave 13 and carries a hook means 17 by which the cable may be connected to an object to be lifted, such as the electric motor 20. The cable 16 is adapted to be wound onto and paid out from a drum 21, which may be rotated by any suitable means. The boom 10 may be pivoted from its retracted to its extended positions, and vice versa, by suitable power-operated mechanism, such as that disclosed in the parent application, Serial No. 73,694, to which reference is made for a detailed description of the mechanism. Suffice it to state herein that the operating mechanism includes a suitable motor 25 which, when energized, rotates a screw within a nut carried by lower extensions of the boom arms, these driving elements not being shown in the present drawings. By this arrangement of elements, the boom 10 may be swung to the positions indicated in Fig. 1 to load the object 20 onto the truck platform 3, or to unload it from the platform onto the ground, such operation being clearly shown in Fig. 1.

The apparatus as thus far described is adapted for use in raising large, heavy objects onto and from the platform, such hoisting means being generally useful when installing on foundations and removing therefrom motors, pumps, and various types of machines. The present invention also contemplates the provision of means for transporting loose material, such as sand, stones, cement, etc., and depositing the same at selected locations. This means includes a box-like container or receptacle 30 having a bottom wall 31, upstanding side walls 32, and a front wall 33. The rearward open end of the receptacle 30 is normally closed by means of a door or gate 34 which is pivoted on a rod 35 extending between the side walls 32. The rearward end of the receptacle 30 aligns with the rearward end of the platform 3 and is pivotally connected to a transverse rod 36.

When the dump receptacle 30 is in the position shown by full lines in Fig. 1, it rests upon the platform 3 and is adapted to receive loose material, which may be placed therein by suitable means. The material thus may be conveyed to any location, together with the object 20 which may rest upon the platform forwardly of the receptacle, as shown in Fig. 1. Upon arriving at the destination, the gate 34 is first released and the dump receptacle is thereafter tilted upwardly to the position indicated by the broken lines in Fig. 1 to serve as a chute through which the material may flow from the back of the truck. The means for tilting the receptacle 30 is constructed and arranged as next described.

Figure 3:
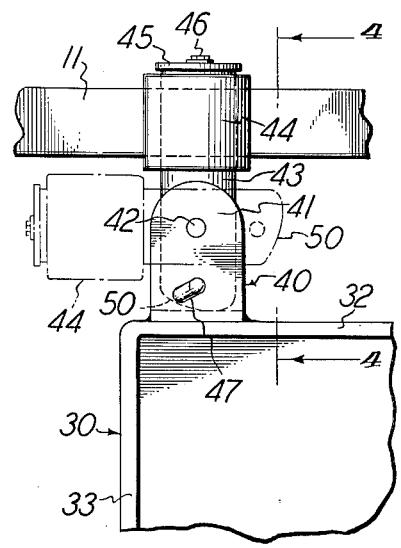
Fig. 3 is an enlarged fragmentary view of a corner portion of the receptacle, showing in full lines the position assumed by one of the tilting rollers and indicating by broken lines the inoperative position of the roller; and, Fig. 4 is a cross-sectional view, taken on the line 4—4 of Fig. 3.
Figure 4:
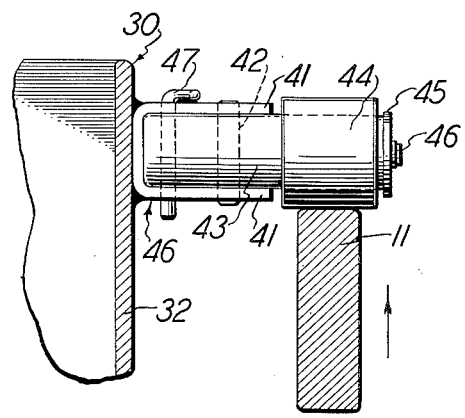

Referring particularly to Figs. 2, 3, and 4, the forward ends of the side walls 32 are provided with U-shaped brackets 40 having vertically spaced, laterally projecting ears 41, the brackets being preferably welded to the side walls. Extending between the ears 41 of each bracket 40 is a vertical pivot pin 42 upon which is pivotally mounted a trunnion 43. Each trunnion 43 projects laterally and rotatably supports an abutment means in the form of a roller 44 at its outer end, the roller being retained on the trunnion by means of a washer 45 and screw 46. Thus, each trunnion may be pivoted to either the operative position, shown by full lines in Figs. 3 and 4, or the inoperative position, indicated by full lines in Figs. 1 and 2 and by dot-and-dash lines in Fig. 3. The rollers 44 may be locked in their operative position by means of locking pins 47 insertable in aligned holes in the ears 41 and each trunnion 43.

Assuming that the truck is to deliver an object 20, in addition to a supply of loose material, the object is placed on the truck platform 3 by pivoting the boom 10 to its extended position, shown by dot-and-dash lines in Fig. 1, attaching the cable 16 to the object, and then pivoting the boom forwardly and winding up the cable to raise the object and move it to a position above the platform, after which the cable is paid out to lower the object onto the platform. The dump receptacle is filled with the loose material and the truck is driven to its destination, at which time the pivotal movement of the boom is reversed to unload the object 20 onto the ground or foundation.

To dump the loose material from the truck, the trunnions 43 are first pivoted outwardly from the broken line position to the full line position in Fig. 3. The locking pins 47 are then inserted to lock the trunnions in their operative position. It is to be noted that when each roller 44 is in its extended, operative position it is disposed within the plane of movement of one of the boom arms 11 with its axis of rotation extending normal to said plane. It is thus apparent that when the boom 10 is pivoted upwardly from its retracted, inoperative position its arms 11 engage and raise the rollers 44 to cause the dump receptacle 30 to pivot upwardly on the pivot rod 36, as indicated by dotted lines in Fig. 1. Thus, the contents of the receptacle are caused to flow from the rearward end of the receptacle. As the boom 10 is returned to its inoperative position, the rollers 44 roll down along the arms 11 to permit the receptacle 30 to descend by gravity upon the platform 3. Referring to Fig. 3, the inner end of each trunnion 43 is provided with a stop means in the form of a cam surface 50, which is adapted to engage against the vertical portion of the U-shaped bracket 40, this engagement further resisting undue rotation of the trunnions and relieving strain on the locking pins 47. After the receptacle has been returned to its initial position, the rollers 44 are pivoted to the position shown in Figs. 1 and 2, that is, out of the path of movement of the arms 11, so that the boom 10 may be subsequently employed, independently of the receptacle, for loading and unloading various objects.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by modified means.

I claim as my invention:

1. In an apparatus of the class described: a vehicle frame; a receptacle having its rearward end pivoted at the rearward end of said frame on an axis extending transversely of said frame, said receptacle normally resting upon said frame; a boom also pivoted on an axis extending transversely of the frame and beneath said receptacle, said boom having arms normally extending forwardly from the pivotal axis of the boom and adapted for movement in vertical planes disposed laterally outwardly of the sides of said receptacle to adapt the boom for pivotal movement from a forward, retracted position to a rearward, extended position with its arms moving alongside the sides of said receptacle; vertical pivot pins carried by the sides of said receptacle adjacent the forward end thereof; trunnions pivoted on said pins; rollers rotatable on said trunnions, said trunnions being adapted to be pivoted to a first position in which said rollers are disposed in the planes of vertical movement of said arms and with their axes of rotation extending normal to said planes so as to be engaged by said arms during pivotal movement of the boom from its retracted position to tilt said receptacle on its pivotal axis, and to a second position in which said rollers are disposed out of said planes with their axes extending substantially parallel to said planes; and releasable locking means for locking said trunnions in their said first position.

2. In an apparatus of the class described: a vehicle frame; a receptacle having its rearward end pivoted at the rearward end of said frame on an axis extending transversely of said frame, said receptacle normally resting upon said frame; a boom also pivoted on an axis extending transversely of the frame and beneath said receptacle, said boom having arms normally extending forwardly from the pivotal axis of the boom and adapted for movement in vertical planes disposed laterally outwardly of the sides of said receptacle to adapt the boom for pivotal movement from a forward, retracted position to a rearward, extended position with its arms moving alongside the sides of said receptacle; U-shaped brackets on the sides of said receptacle adjacent the forward end of the latter, each bracket having a pair of vertically-spaced, horizontally-projecting ears; a pivot pin extending vertically between the ears; trunnions pivoted on said pins; rollers rotatable on said trunnions, said trunnions being adapted to be pivoted to a first position in which said rollers are disposed in the planes of vertical movement of said arms and with their axes of rotation extending normal to said planes so as to be engaged by said arms during pivotal movement of the boom from its retracted position to tilt said receptacle on its pivotal axis, and to a second position in which said rollers are disposed out of said planes with their axes extending substantially parallel to said planes, said ears and said trunnions having holes adapted to align when the trunnions are in their said first position; and locking pins insertable in said aligned holes to lock said trunnions in said first position.

3. In an apparatus of the class described: a vehicle frame; a receptacle having its rearward end pivoted at the rearward end of said frame on an axis extending transversely of said frame, said receptacle normally resting upon said frame; a boom also pivoted on an axis extending transversely of the frame and beneath said receptacle, said boom having arms normally extending forwardly from the pivotal axis of the boom and adapted for movement in vertical planes disposed laterally outwardly of the sides of said receptacle to adapt the boom for pivotal movement from a forward, retracted position to a rearward, extended position with its arms moving alongside the sides of said receptacle; U-shaped brackets on the sides of said receptacle adjacent the forward end of the latter, each bracket having a pair of vertically-spaced, horizontally- projecting ears; a pivot pin extending vertically between the ears; trunnions pivoted on said pins; rollers rotatable on said trunnions, said trunnions being adapted to be pivoted to a first position in which said rollers are disposed in the planes of vertical movement of said arms and with their axes of rotation extending normal to said planes so as to be engaged by said arms during pivotal movement of the boom from its retracted position to tilt said receptacle on its pivotal axis, and to a second position in which said rollers are disposed out of said planes with their axes extending substantially parallel to said planes, said ears and said trunnions having holes adapted to align when the trunnions are in their said first position; and locking pins insertable in said aligned holes to lock said trunnions in said first position, said trunnions having stop means at one end engageable against said brackets to resist pivotal movement of said trunnions when said rollers are engaged by said arms of said boom.

LOURIE L. EAKIN.

References Cited in the file of this patent

UNITED STATES PATENTS

| Number | Name | Date |
|---|---|---|
| 1,378,631 | Stone | May 17, 1921 |
| 2,130,117 | Butts | Sept. 13, 1938 |
| 2,170,932 | Venema | Aug. 29, 1939 |
| 2,386,216 | Hay | Oct. 9, 1945 |
| 2,506,914 | Beeler | May 9, 1950 |
| 2,554,140 | Eakin | May 22, 1951 |